June 3, 1958     J. W. L. KÖHLER     2,836,969
GAS RECTIFYING SYSTEM
Filed Oct. 5, 1954
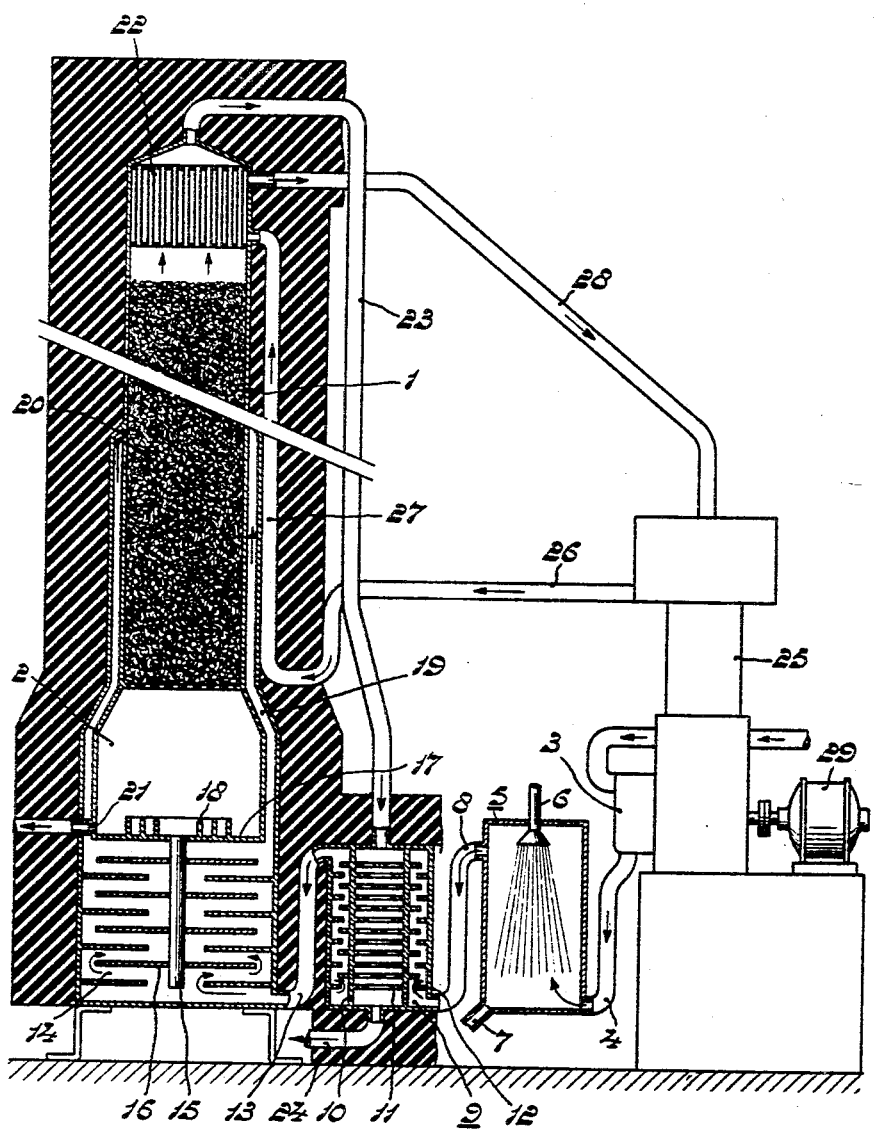
INVENTOR
JACOB WILLEM LAURENS KÖHLER
BY
AGENT 2,836,969

GAS RECTIFYING SYSTEM

Jacob Willem Laurens Köhler, Eindhoven, Netherlands, assignor, by mesne assignments, to North American Philips Company, Inc., New York, N. Y., a corporation of Delaware Application October 5, 1954, Serial No. 460,442

Claims priority, application Netherlands October 22, 1953

3 Claims. (Cl. 62—123)

The invention relates to a method of separating air in a gas rectifying system comprising a gas rectifying column operating under atmospheric or substantially atmospheric pressure, the oxygen being obtained as a liquid, at least part of the air, before it is separated being cooled under atmospheric or substantially atmospheric pressure by a thermal contact with the oxygen.

It is known that with a gas rectifying column heat is withdrawn from the upper side and supplied on the lower side. The heat is often supplied in a heat exchanger in which a liquid which is rich in the constituent having the highest boiling point is in thermal contact with the gaseous mixture to be fractionated, the liquid thus evaporating. If air is separated in the aforesaid system, it being required to obtain the oxygen in the liquid state, the fraction having the lowest boiling point, i. e. the nitrogen, escaping in the column being heated again to approximately the starting temperature of the air owing to the thermal contact with the air, it is found that the heat content of the air is lower than the amount of heat required for separating, so that heat must be supplied to the system in a different manner.

If the air contains the normal impurities, for example carbonic acid and water vapour, they could be frozen out by means of a thermal contact with a medium associated with the gas rectifying system for example the nitrogen or the oxygen, so that heat is supplied to the system. The remainder of the required heat must then be supplied to the liquid in the boiling vessel in a different manner. This method has a limitation in that, if the quantity of impurities contained in the air varies, which is frequently the case in practice, the quantity of heat supplied to the column will also vary, so that the equilibrium in the system is disturbed.

As an alternative, the impurities could be extracted from the air by chemical means, but this has the disadvantage that the heat is to be supplied in a different manner to the column, while moreover the system is materially more costly due to the chemical agents.

The invention has for its object to supply the air in such a state to the system that even if the composition of the air varies the quantity of heat supplied to the oxygen remains as constant as possible.

According to the invention, the impurities contained in the air are removed by freezing by means of a thermal contact with a medium associated with the gas fractionating system, while prior to freezing out the impurities, the air is saturated with water vapour. This method has, as stated above, the advantage that even under changed conditions the air is supplied to the system with an at least substantially constant heat content. It is furthermore favourable that with air of room temperature, for example about 15° C. the amount of heat supplied in this manner to the system happens to be just sufficient to supply the required heat energy for the column, so that no additional amount of heat need be supplied to the boiling vessel. The air may be saturated with water vapour for example by blowing the air through a rain of fine water drops or by causing the air to rise up through water.

The gas rectifying system suitable for carrying out the method described above has the feature that the system comprises a gas rectifying column and, moreover, a heat exchanger in which the gaseous mixture to be separated is in thermal contact with the oxygen and a heat exchanger, in which the impurities in the gaseous mixture are removed by freezing, while provision is furthermore made of means to saturate the air with water vapour before the impurities have been frozen out.

The heat to be withdrawn from the gas rectifying system is preferably withdrawn, in accordance with a preferred embodiment of the invention, by means of a cold-gas refrigerator; thus a simple, readily controllable system is obtained. The term "cold-gas refrigerator" is to be understood to mean herein a cooling machine operating upon the so-called reversed hot-gas engine principle. Such machines may, as is known, be constructed in various forms, for example as displacer-piston machines, as double-acting machines, as machines in which the cylinders are arranged in the form of a V, or as machines the working space of which is combined with that of a hot-gas engine. The heat exchanger in which the gaseous mixture to be separated is in thermal contact with the oxygen and the heat exchanger in which the impurities of the gaseous mixture are frozen out are preferably combined, so that in accordance with a further embodiment of the invention the gas rectifying system comprises a heat exchanger in which both the gaseous mixture is in thermal contact with the oxygen and the impurities of the gaseous mixture are frozen out.

As stated above, the gas rectifying column of the system may be constructed as a single column.

The invention will now be described with reference to the accompanying drawing, which shows one embodiment.

The gas rectifying system comprises a single rectifying column 1, having a boiling vessel 2. The air to be separated is supplied with a temperature of about 15° C., i. e. with room temperature, by means of a compressor 3. The excess pressure of this compressor suffices to push the gaseous mixture to be separated through the system, but the excess pressure is so low that the gas rectifying column operates under atmospheric or substantially atmospheric pressure. After the pressure has been slightly increased in the compressor 3, the air to be separated flows through a duct 4 to a space 5, in which it is saturated with water vapour. To this end the space 5 comprises a spray 6, by means of which a water curtain is formed through which the air is blown. The water used to this end is conducted away through a duct 7. Then the air flows through a duct 8, communicating with the top end of the space 5, to a heat exchanger 9, in which the air is in thermal contact with the gaseous fraction having the lowest boiling point, i. e. the nitrogen escaping from the column. The heat exchanger 9 is provided to this end with a tube 10, the interior of which is provided with perforated intermediate partitions and the outer side of which is provided with extensions 12. The impurities contained in the gaseous mixture, for example water vapour and carbonic acid are frozen out on these extensions, which are, to this end, spaced apart from one another in a manner such that the relative temperature difference is at the most 20° C., preferably, however, not more than 10° C. The air then flows through a duct 13 to a second heat exchanger 14. This heat exchanger comprises a support 15, having transverse extensions 16. The support 15 is connected thermally with the bottom 17 of the boiling vessel 2. In this heat exchanger any impurities contained in the air are frozen out. The heat withdrawn from the air to be separated in this heat exchanger is supplied through the support 14 and the bottom 17 of the boiling vessel, provided with extensions 18, to the liquid contained in the boiling vessel, so that at least part of the liquid contained in the boiling vessel evaporates. The extensions 16 of the heat exchanger 14 are arranged in a manner such that their relative temperature difference is not more than 20° C., preferably not more than 10° C. Such a heat exchanger has been suggested by C. O. Jonkers et al. in United States patent application Serial No. 437,456, filed June 17, 1954, now Patent No. 2,802,345.

After the air has been cooled in the heat exchanger 14, it flows through a ring channel 19 surrounding the boiling vessel and the column 1 and arrives through ports 20 in the column where the air is separated into fractions. The fraction having the lowest boiling point, i. e. the nitrogen, rises upwards in the column, whereas the fraction having the highest boiling point, i. e. the oxygen, is collected as a liquid in the boiling vessel 2. Part of the liquid contained in the boiling vessel evaporates owing to the supply of heat through the support 14 and rises again up in the column, whereas a further part of the oxygen is conducted away from the system through a duct 21.

The gaseous fraction having the lowest boiling point, rising also up in the column, i. e. the nitrogen, is condensed partly by means of a condenser 22 provided in the upper part of the column. The condensate flows as a washing liquid down in the column. The remainder of the gaseous fraction is supplied through a duct 23 to the heat exchanger 9, in which it is in thermal contact with the air to be separated. The gaseous nitrogen, the temperature of which has been raised, leaves this heat exchanger through the duct 24.

Heat is withdrawn from the condenser 22 by means of a cold-gas refrigerator 25. This cold-gas refrigerator condenses a heat-transferring intermediate means, for example nitrogen, after which the condensate is supplied through a duct 26 to a duct 27. The duct 27 opens out in the condenser 22 and the condensate contained in this duct is in thermal contact with the gaseous mixture flowing through the ring channel 19, over part of the height of the duct, so that in the duct 27 a bubble-up pump effect is produced and the liquid intermediate means is transported upwards. In the condenser 22 the intermediate means evaporates, so that heat is withdrawn from the fraction with the lowest boiling point at that area. The evaporated intermediate means flows through a duct 28 to the cold-gas refrigerator, where it is recondensed. The cold-gas refrigerator 25 is driven by means of an electric motor 29. The compressor 3 is connected to the crank shaft of the cold-gas refrigerator, so that this compressor is also driven by the electric motor.

If the moisture content of the air sucked in from the atmospheric varies, the moistening system in the space 5 not being switched on, the amount of heat supplied to the gas rectifying system would also vary, so that any equilibrium in the heat balance of the gas rectifying system could be disturbed. Since in the method according to the invention the air is always saturated with water vapour, a variation of the moisture content of the atmospheric air does not affect adversely the satisfactory operation of the system.

What is claimed is:

1. A gas rectifying system comprising a gas rectifying column provided with a condenser and a boiler, a first heat exchanger in which air to be separated is in thermal contact with nitrogen and some impurities are separated from the air, a second heat exchanger in which the additional impurities in the air to be separated are removed by freezing out, means to saturate the air with water vapor before said impurities have been frozen out in order to increase the heat content of said air, said heated air heating the oxygen in said boiler, said condenser in said rectifying column for condensing said nitrogen, and a cold-gas refrigerator for withdrawing heat from said condenser.

2. A gas rectifying system as set forth in claim 1 wherein said gas rectifying column is constructed in the form of a single column.

3. A gas rectifying system comprising a gas rectifying column provided with a condenser and a boiler, a heat exchanger in which air to be separated is in thermal contact with the oxygen and the impurities in the air are frozen out, means to saturate the air with water vapor before said impurities have been frozen out in order to increase the heat content of the air, said heated air heating the oxygen in said boiler, said condenser in said rectifying column for condensing said nitrogen, and a cold-gas refrigerator for withdrawing heat from said condenser.

References Cited in the file of this patent

UNITED STATES PATENTS

| | | |
|---|---|---|
| 2,141,997 | Linde | Dec. 27, 1938 |
| 2,516,717 | Ogorzaly | July 25, 1950 |
| 2,555,060 | Schuftan | May 29, 1951 |
| 2,560,469 | Ogorzaly | July 10, 1951 |
| 2,627,731 | Benedict | Feb. 10, 1953 |
| 2,643,527 | Keith | June 30, 1953 |